[54] MULTI-MODE HYDROSTATIC TRANSMISSION

[76] Inventor: Samuel Shiber, P.O. Box 371, Mundelein, Ill. 60060

[21] Appl. No.: 9,673

[22] Filed: Feb. 5, 1979

Related U.S. Application Data

[63] Continuation-in-part of Ser. No. 875,731, Feb. 6, 1978.

[51] Int. Cl.² ............... F16H 39/10; F15B 1/02
[52] U.S. Cl. ....................... 60/414; 60/437; 60/490
[58] Field of Search ............ 60/414, 435, 437, 438, 60/487, 490, 413; 74/687

[56] References Cited

U.S. PATENT DOCUMENTS

| | | |
|---|---|---|
| 2,371,922 | 3/1945 | Saito .................. 60/490 |
| 2,827,763 | 3/1958 | Govan et al. ............ 60/414 |
| 3,059,432 | 10/1962 | Thoma .............. 60/490 X |
| 4,037,409 | 7/1977 | Leibach ............ 60/437 X |
| 4,098,144 | 7/1978 | Besel et al. ............ 74/686 X |

FOREIGN PATENT DOCUMENTS

| | | |
|---|---|---|
| 203867 | 9/1923 | United Kingdom . |
| 753512 | 7/1956 | United Kingdom . |
| 814478 | 6/1959 | United Kingdom . |
| 1204021 | 9/1970 | United Kingdom . |

Primary Examiner—Edgar W. Geoghegan
Attorney, Agent, or Firm—Samuel Shiber

[57] ABSTRACT

A gearless split torque (mechanical/hydrostatic), twin range (reduction/overdrive) with a direct mechanical drive in-between, hydrostatic transmission with regenerative braking and engine starting capabilities comprising two hydraulic pumps tied together by a clutch.

11 Claims, 2 Drawing Figures

MULTI-MODE HYDROSTATIC TRANSMISSION

BACKGROUND OF THE INVENTION

This application is a continuation in part of my co-pending application Ser. No. 875,731 filed on Feb. 6, 1978.

Due to the limited supply of gasoline and its corresponding high cost, the importance of minimizing fuel waste in vehicles has taken new dimensions in recent years.

Presently automobiles waste fuel in several ways, some of which are:

1. During braking the vehicle's kinetic energy is transformed to heat which is dissipated to the surroundings.
2. When moving in congested traffic, the engine operates very inefficiently and is running continuously even when the vehicle is standing.
3. Present transmissions usually have a few fixed ratios vs. an infinitely variable transmission which can continuously provide an optimal ratio. Further, present day automatic transmissions introduce additional power losses in the torque converter and hydraulic pump areas.

An object of the present invention is to provide a transmission which will eliminate the above and other inefficiencies.

The advantages of regenerative braking, intermittent engine operation at an optimal speed and an infinitely variable transmission, as well as the value of these features to the fuel economy of a vehicle, are all know. However, to date, no system could be built that will provide these features without introducing undesirable and intolerable side effects of cost, complexity and bulk.

SUMMARY OF THE INVENTION

The present invention relates to a gearless hydrostatic split torque, (mechanical/hydrostatic), twin range (reduction mode/overdrive mode) with a direct mechanical mode in-between, automotive power transmission which is adapted to incorporate regenerate braking and engine starting ability in one simple, compact, light and inexpensive hardware package.

The transmission is adapted to operate in several modes in order to maximize fuel economy in various driving conditions: over the highway the transmission provides a direct mechanical drive (lock-up); when descending a long incline it operates in over-drive; in the city the transmission provides added hydrostatic torque; and in stop-and-go traffic the transmission is fully hydrostatic, enabling the engine to operate intermittently, charging an accumulator at an optimal rate and shutting itself off until the accumulator is almost depleted, at which point the transmission restarts the engine which recharges the accumulator.

During braking the transmission efficiently converts the vehicle's kinetic energy to pressurized fluid stored in the accumulator, to be reused for accelerating the vehicle later on or for some other needed function.

While all the above features and their economical value is well established in the art, as mentioned previously, the unique aspect of the combination of the present invention is that it achieves all these goals without introducing unacceptable side effects of complexity, cost or bulk. On the contrary, it provides all these features with a system whose hardware is substantially simpler than present day automatic transmissions. Further, the present system eliminates the conventional starting system, part of the braking system and it does the majority of actual braking.

It can also be appreciated from the foregoing specification that the two pumps, which are combined in a unique way to form the transmission, are similar to conventional piston pumps. Thus, the present invention does not require any unproven or non-existing technology or manufacturing processes.

The control, specific construction whereof is not within the scope of the present invention, can incorporate an electronic micro-processor to translate driver's inputs through the brake accelerator and gear shift levers to optimal setting of the transmission and engine elements.

DETAILED DESCRIPTION OF THE DRAWINGS

Figures 1, 2:
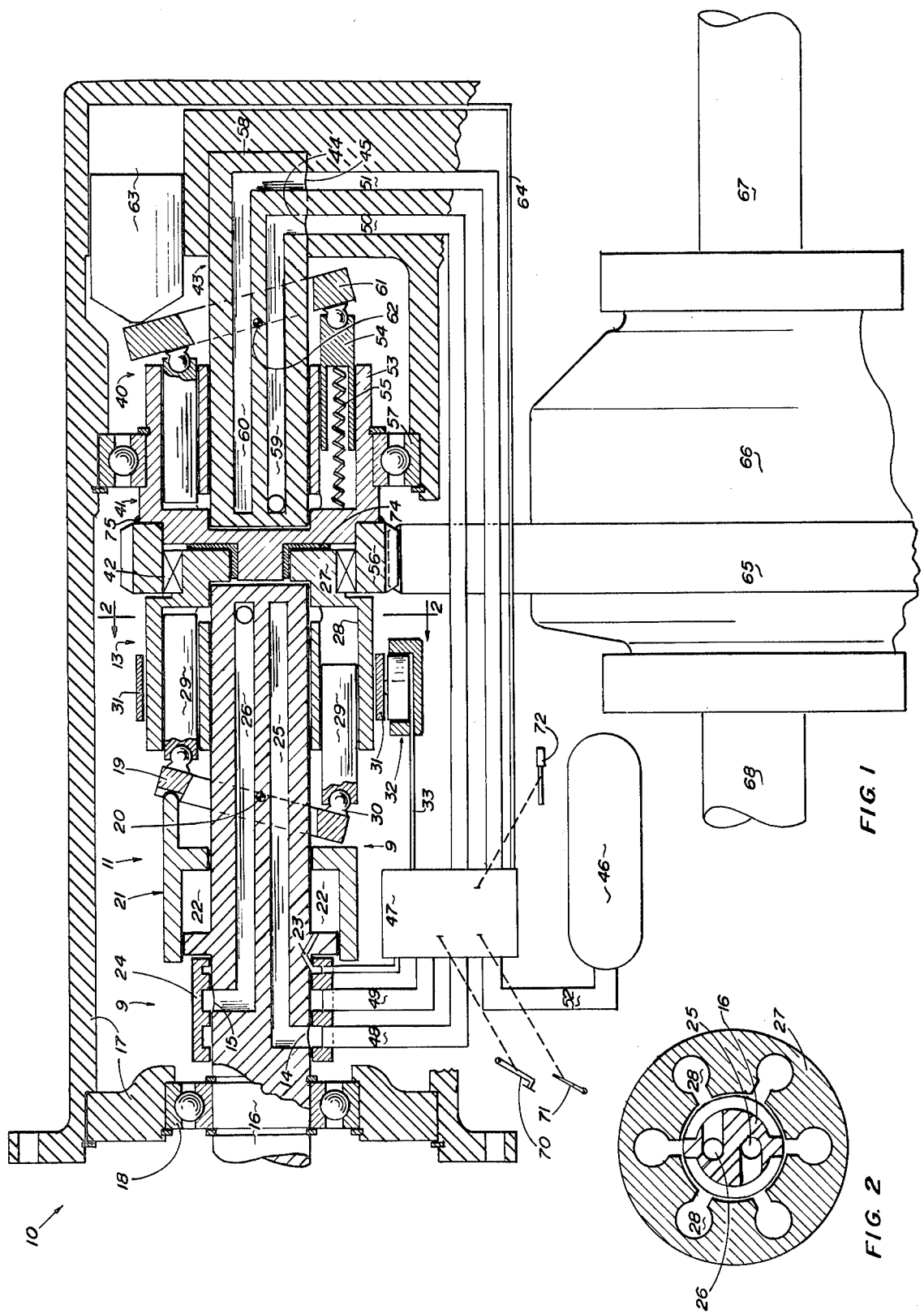
FIG. 1 is a side cross-sectional view of a transmission according to the present invention.
FIG. 2 is a cross-sectional view along line 2—2 marked on FIG. 1.

FIGS. 1 and 2 show a hydrostatic transmission 10 adapted for a plurality of operational modes, comprising:

A first variable displacement pump 11 having a first section serving as a mechanical input member 9 of the transmission, a second section 13, an inlet port 14 and an outlet port 15.

The first section of the first pump comprises a shaft 16 rotatably supported by a housing 17 through a ball bearing 18. The shaft carries and rotates with a swash plate 19 which is pivotally inclined about an axis 20 (carried by the shaft) by a servo-actuator 21 (which also rotates with the shaft). The actuator is operated by pressurized fluid directed to its cavity 22 through a passage 23 and a slip ring 24. The shaft defines inlet and outlet passages 25 and 26, respectively, which communicate with the ports 14 and 15 via the slip ring.

The second section of the first pump comprises a drum 27 defining six cylinders 28 in which pistons 29 are slidably disposed. Each piston has a shoe 30 which slides against the swash plate 19.

A band brake 31 is actuated by a cylinder assembly 32 in response to pressurized fluid communicated to it by a conduit 33 from a control 47.

A second variable displacement pump 40, having a first portion 41 serving as a mechanical output member of the transmission, is coupled to the second section 13 by a one-way clutch 42 and a flange bearing 74. A second portion 43 of the second pump is anchored to the housing. Numerals 44 and 45 indicate suction and discharge ports, respectively. (As will be discussed later either pump serves as a motor in some of the operational modes, and commonly pumps can reverse their role in this manner. However, to avoid confusion, assemblies 11 and 40 will be referred to as "pumps" throughout the text of this application regardless of whether they convert mechanical energy to pressurized fluid flow or vice versa).

An accumulator 46 is adapted for storing fluid under pressure.

The control 47 is connected to ports 14, 15, 44, 45 and to the accumulator through conduits 48, 49, 50, 51 and 52, respectively. The control is also connected to a brake pedal 70, an accelerator pedal 71 and a shift lever 72 and to an engine (not shown).

The first portion of the second pump is similar to the second of the first pump, and comprises a drum 53 and pistons 54 (each piston is urged outwardly by a spring 55, one shown). The drum 53 has a gear 56 affixed to it by a weldment 75 and serves as an output member of the transmission. The drum 53 is rotatably supported by a ball bearing 57.

The second portion of the second pump comprises a center post 58 defining suction and discharge passages 59 and 60 respectively (similar to the inlet and outlet passages of the first pump) which communicate with the ports 44 and 45 respectively. A swash plate 61 is pivotally inclinable about an axis 62 by a cylinder assembly 63 which is controlled by pressurized fluid communicated to it by a conduit 64 from the control 47. The gear meshes with a ring gear 65 of a differential 66 which in turn drives right and left wheels (not shown) through axles 67 and 68 respectively.

The engine (not shown) drives the transmission mechanical input member 16.

OPERATION

The present transmission is adapted to operate in a plurality of modes as a transmission, and in addition as a regenerative brake and as an engine starter. These various operational modes will be reviewed herein:

Direct lock-up mode is achieved by inclining the swash plate 19 and by the control 47 blocking the outlet port 15 in the control 47 or by connecting it to one of the second pump ports 44 or 45, and cancelling the inclination of the swash plate 61. This locks the two sections of the first pump one to the other, and in this mode the power is transmitted directly from the mechanical input member 16 through the first pump 11, through the one-way clutch 42 to the mechanical output member. This mode of operation is well suited for highway travel, etc. In the direct mode, 100% of the power is conveyed mechanically and the transmission's efficiency is closed to 100%. The speed ratio and torque ratio are practically both 1 to 1.

Reduction mode is achieved by inclining both swash plates and connecting the outlet port 15 to the suction port 44. To illustrate this mode, it will be assumed that the engine and the mechanical input member rotate at 2000 RPM and the mechanical output member rotates at 1000 RPM. That is a 2:1 speed reduction and close to a 2:1 torque multiplication. It can be observed that the relative speed between the swash plate and the drum in both pumps is 1000 RPM and since the pumps are in a series connection, this means that they are set in this speed ratio at equal displacements per revolution (ignoring volumetric inefficiencies, etc).

In this mode the power is split. The engine's full torque is conveyed mechanically from the mechanical input to the output member, exactly as in the direct mode. The relative rotation occuring in the first pump 11 is translated to pressurized fluid flow which is translated to an additinal torque of the mechanical output member by the second pump 40.

With an increase of the volume per revolution of the second pump 40 vs. the first pump 11, the transmission's speed ratio decreases and vice-versa. In all these ratios, the torque at the mechanical output member is the sum of the engine's torque, which is passed mechanically through the transmission exactly as in the direct mode, plus the additional torque generated by the second pump 40. The inefficiency that typifies hydrostatic transmissions applies only to the part of the power which is conveyed hydrostatically to generate this additional torque.

Thus, the overall efficiency of the transmission, especially when used in a direct mode, or a ratio close to direct mode, a substantial part of the time, can be very high.

Overdrive mode is achieved by inclining both swash plates and connecting the discharge port 45 to the outlet port 15. In this mode, part of the engine torque is passed mechanically through the first pump to the second pump to generate pressurized fluid which is used by the first pump to rotate both drums (which are coupled by the one-way clutch 42) at a speed over engine speed. Thus the torque is reduced and the speed is increased between the mechanical input and output members. In this mode, as in the reduction mode, the power is split with the hydrostatic inefficiency applicable only to the part carried hydrostatically. The importance of the over-drive mode is that it permits one to design the direct ratio to be in the middle of the ratio range which is in heavy statistical usage, thereby improving the overall efficiency of the transmission.

As can be seen in this mode the outlet port 15 receives pressurized fluid, however, for consistency of description the names of the ports which were coined in relation to their function in the reduction mode are used throughout the text to avoid confusion. It can also be noted that instead of physically switching and/or blocking ports one can shift the transmission continuously from the reduction mode through the direct mode to the overdrive mode by cancelling the inclination and by reversing the inclination, respectively, of the swash plate 61 since cancelling the inclination makes the second pump 40 act as a blockage to fluid flow between its ports 44 and 45, and since reversing the inclination reverses the ports' function. It can be further noted that while either of these methods would work there are structural and efficiency considerations which may cause a designer to prefer one method over the other.

Regenerative braking mode is accomplished by connecting the discharge port 45 of the second pump 40 to the accumulator. The braking torque is increased or decreased by increasing or decreasing, respectively, the inclination of the swash plate 61. Thus, the kinetic energy of the vehicle is efficiently transformed to fluid under pressure in the accumulator, which can be reused to reaccelerate the vehicle.

Engine starting mode is accomplished by actuating the band brake 31 to anchor the drum 27, and by connecting the charged accumulator to the inlet port 14 of the first pump 11 which rotates the mechanical input member and the engine which is coupled to it.

Hydrostatic mode is accomplished by anchoring the drum of the first pump with the band brake 31 and by connecting the output port 15, the suction port 44 and the accumulator to one another. In this mode, the control causes the engine to work intermittently at a certain optimal speed, charging the accumulator. When the accumulator is charged, the control shuts off the engine and the car continues to move, accelerate, stop, etc. on power supplied from the accumulator.

When the accumulator is depleted to a certain level of its energy storing capacity, the control connects the input port 14 to it, causing the first pump to restart the engine (as previously explained) and recharge the accumulator.

This mode of operation is most suitable for moving in stop-and-go or very slow traffic.

Reverse mode is achieved by inclining both swash plates and connecting the discharge port 45 to the outlet port 15, as in the overdrive mode. However, in the reverse mode the relative inclination of the swash plates 19 and 61 is such that the displacement per revolution of the second pump 40 is greater than that of the first pump 11, whereas in the overdrive mode the opposite is true.

The one-way clutch 42 can be substituted or tied in series to a selectively actuatable clutch, which, in the reverse mode, would circumvent the coupling of the one-way clutch 42. This would allow the reverse mode to be carried out as a part of the hydrostatic mode, at an improved efficiency. However, in most road vehicles the reverse mode is rarely used, and therefore compromising its efficiency may be acceptable. An advantage of the one-way clutch is that it is automatically self-energized.

Hybrid-mode is one of the previously discussed modes (other than the hydrostatic mode), which like the hydrostatic mode, is modified to maintain the accumulator charged by metering into it pressurized fluid from the transmission. The continuous availability of hydraulic power allows the design of the vehicle's auxilliary power driven units such as alternator, fan, air-conditioning compressor, etc, to be hydraulically and selectively driven, rather than mechanically driven by the engine. This arrangement has some advantages in allowing the location and regulation of the speed of these auxilliary units independent of engine's location and speed.

While the present invention has been illustrated with a single embodiment, it will be appreciated that modifications and substitutions can be made without departing from the spirit of the invention and the scope of the claims.

I claim:

1. A hydrostatic transmission adapted for a plurality of operational modes, comprising in combinations:

a. a first pump having a first section serving as a mechanical input member of said transmission, a second section, an inlet port and an outlet port, b. a second pump having a first portion serving as a mechanical output member of said transmission and coupled to said second section by clutch means, a second anchored portion, a suction port and a discharge port.

2. A transmission as in claim 1 having control means connected to said ports via conduits.

3. A transmission as in claim 2 having an accumulator for storing fluid under pressure connected via conduits to said control means.

4. A transmission as in claim 1 wherein said clutch means comprise a one-way clutch.

5. A transmission as in claim 1 wherein at least one of said pumps is a variable displacement pump.

6. A transmission as in claim 2 wherein said control means blocks said outlet port to effect a direct coupling of said mechanical input member to said mechanical output member.

7. A transmission as in claim 1 wherein said control means connects said outlet port to said suction port to effect a reduction ratio.

8. A transmission as in claim 1 wherein said control means connects said discharge port to said outlet port to effect an overdrive ratio.

9. A transmission as in claim 3 wherein said control means connects said discharge port to said accumulator to effect regenerative braking of said mechanical output member.

10. A transmission as in claim 3 with brake means for selectively anchoring said second section while said control means connects said inlet port to said accumulator for rotating said mechanical input member.

11. A transmission as in claim 3 with brake means for selectively anchoring said second section while said control means connects said outlet port, said suction port and said accumulator together to effect a hydrostatic mode.

* * * * *